2 Sheets—Sheet 1.

R. N. ALLEN.

RAILWAY CAR-WHEEL.

No. 7,142. Reissued May 30, 1876.

WITNESSES.

A. S. Coomb.

J. Hugo Pruth

INVENTOR.

R. N. Allen.

Per Burridge & Co

Attys.

N. PETERS, PHOTO-LITHOGRAPHER, WASHINGTON, D. C.

R. N. ALLEN.

RAILWAY CAR-WHEEL.

Reissued May 30, 1876.

No. 7,142.

WITNESSES.

A. F. Cornell.

J. Mayo Smith

INVENTOR.

R. N. Allen.

Per. Burridge & Co

Attys.

N. PETERS, PHOTO-LITHOGRAPHER, WASHINGTON, D. C.

UNITED STATES PATENT OFFICE.

RICHARD N. ALLEN, OF HUDSON, NEW YORK.

IMPROVEMENT IN RAILWAY-CAR WHEELS.

Specification forming part of Letters Patent No. 128,939, dated July 16, 1872; reissue No. 7,142, dated May 30, 1876; application filed October 26, 1875.

*To all whom it may concern:*

Be it known that I, RICHARD NORTON ALLEN, of Hudson, in the county of Columbia, and State of New York, have invented a certain new and Improved Railway-Car Wheel, of which the following is a complete description, reference being had to the accompanying drawings, making part of this specification, in which—

Figure 1:
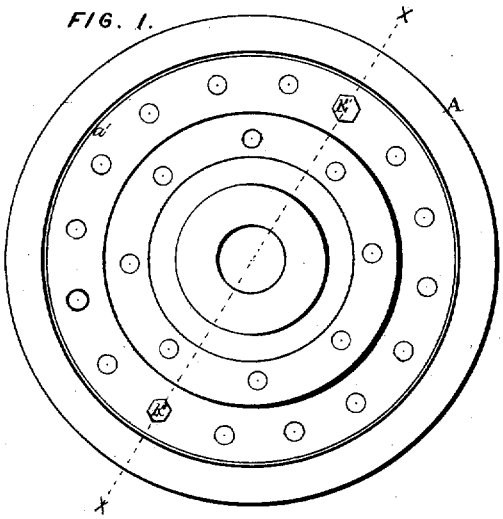
Figure 2:
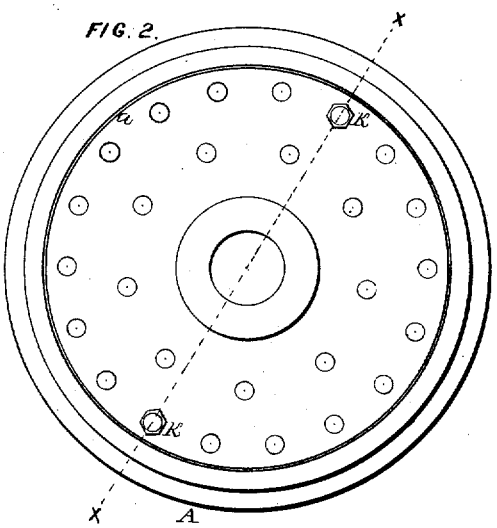
Figure 3:
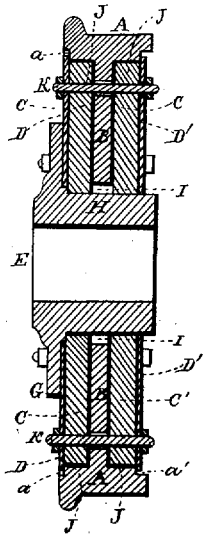
Figure 4:
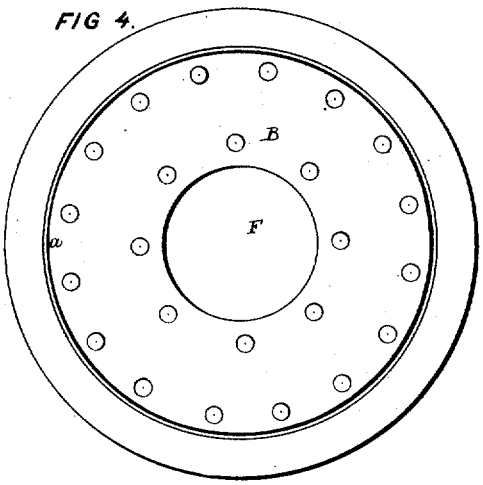
Figure 5:
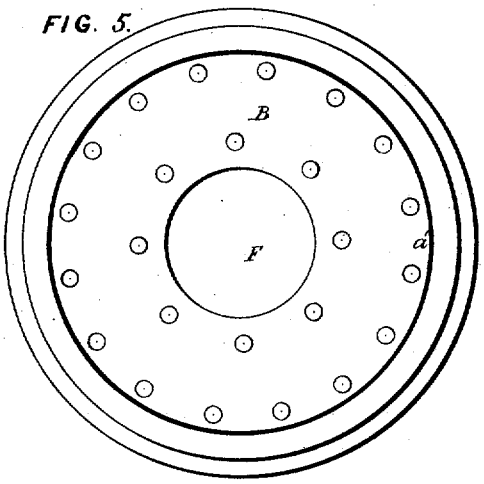
Figure 6:
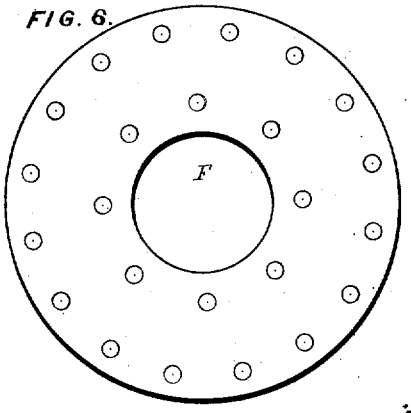
Figure 7:
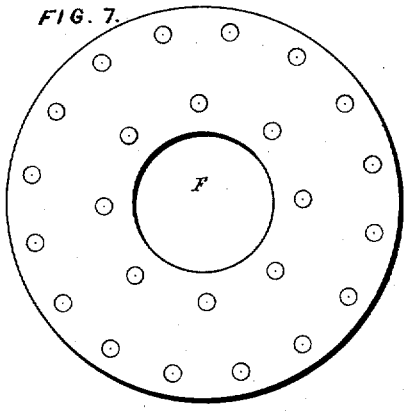
Figure 8:
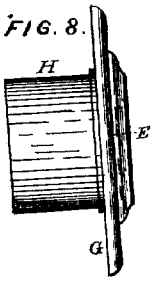

Figure 1 is a view of back face of the wheel. Fig. 2 is a view of the front face of the same. Fig. 3 is a transverse section in the direction of the line *x x*, in Figs. 1 and 2. Figs 4, 5, 6, 7, and 8, are detached sections, which will be referred to in the following description.

Like letters of reference refer to like parts in the several views.

The nature of my improvement relates to making of metal the tire of the wheel with an interior annular web or flange to give additional strength or firmness to the wheel, and having a recess or space between said web and the perimeter or rim of the tire, that it shall project at some point more or less distant from the circumferential sides thereof, so as to form one or more rabbets between the web and rim to receive a packing or filling of prepared paper or other suitable material for this purpose, and anterior to this paper filling or packing are metallic plates, so arranged in relation to the tire, web, and paper filling as to form even or flat faces or covering to the wheel, or nearly so. These parts are connected together by bolts passing through the said web, paper filling, and outside plates. Thereby the several parts are firmly and securely united.

The hub is made in a separate piece with a flange or collar, which hub is firmly fitted into a central bore or opening through the outside plates and paper filling, but leaves a space between the interior flange of the tire and hub. Said hub is firmly secured in place by bolts, thus forming a wheel, which, by its peculiar construction and arrangement of parts, renders its strong, safe, and durable, and at the same time gives a slight, easy spring, or yielding action to the jars and strains of the track and train, thereby causing the cars to run with more ease and comfort to the traveler, and with less injury to the track, than wheels of the ordinary kind.

It is designed to make the tire A, Figs. 1, 2, and 3, of iron or steel, or its equivalent, and to secure to such tires the requisite strength without unusual weight of metal. There is connected with the interior face of the tire an annular flange or web, B, Figs. 3, 4, and 5, Figs. 4 and 5 being views of opposite sides of the tire A and interior flange. On each side of this flange is a cavity or recess, which is filled up by the paper packing or plates C C′, or its equivalent, as seen in Fig. 3. This filling or packing of paper prepared for this purpose is closely and securely fitted into each recess. Outside of this filling C C′ are plates D D′, as seen in Fig. 3, and it will be observed that the hub E, Fig. 8, passes through the bore F, or holes in the flange B, filling C C′, and plates D D′. The flange G of the hub laps upon the plate D, forming the back of the wheel. The interior flange B does not extend to, nor is it in contact with, the sleeve H of the hub. On the contrary, there is an annular space extending around the outside of the sleeve and the interior edge of the web B, as indicated at I, Fig. 3, while the paper filling C C′ is in close contact with the sleeve, and their peripheries fit closely to the face or sides of the recess at J, on each side of the flange B. It is designed to have these packings or fillings to fit tightly around the hub, and into and against the inner face of the tire, as before noted. The base of the outside plates D D′ are also made to fit tightly upon the sleeve of the hub, while their circumference is less than that of the circumferences in which they are respectively placed, as seen at *a a′*, Fig. 3. Each plate rests upon a shoulder of said recess, as shown. When the parts are thus put together they are secured firmly by bolts and nuts K, which bolts, as will be observed, pass through the plates, filling, and flange B, with a nut upon the outside, or otherwise secured in place, there being a series of holes through the said parts for the reception of screw-bolts to secure the parts together. These bolts, as will be noted, are smaller than the bolt-holes through the flange B, for a purpose hereinafter stated.

By this construction and arrangement of the parts comprising the wheel, the principal weight is brought upon the filling, as the periphery of it is in tightly-fitting contact with the interior face of the rim or tire A at J, and the base of the filling also fits tightly upon the sleeve H of the hub, and as there is an annular space, I, between the sleeve H and the web B, and space at *a a'* between the periphery of the plates and circumference of the recesses, and as the bolts K are smaller than the holes through the web B, it follows, as before mentioned, that the chief weight or support of the wheel rests upon the fillings or packing C C', and there being a certain amount of elasticity in the said fillings, it follows that there will be a springing or elastic character to the wheel, which will cause the cars to run with less wear and strain, and with more ease to the passenger than with wheels of the usual construction. There is elasticity enough in these wheels described to resist the heavy jars, blows, and strains which are experienced more or less by a solid iron wheel. The interior web or flange B insures great additional strength to a cast-iron tire, (and which may be used in steel tires cast.) In case the rim should break or crack through when in use, the web with its fastenings would so hold the wheel as to prevent accident therefrom. In the event of the rim of the flange breaking or splitting together from the circumference of the rim to the base of the web, these broken parts could not be separated or detached from the wheel, owing to the method of so securely fastening the parts together, and to the flange or web B. The section could not be detached in case of such fracture without removing the bolts.

What I claim as my invention, and desire to secure by Letters Patent, is—

In railway-car wheels, the metallic tire, with an annular flange or web, B, in combination with paper filling or packing, plates D D', and hub, substantially as and for the purpose set forth.

RICHARD N. ALLEN.

Witnesses:

WILLIAM E. HULL,
E. G. BENCH.